(12) United States Patent
Gundlach

(10) Patent No.: US 7,810,637 B2
(45) Date of Patent: Oct. 12, 2010

(54) POSITIVELY DRIVEN, TRACKING FLAT BELT AND CONVEYOR

(75) Inventor: James O. Gundlach, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 2 days.

(21) Appl. No.: 12/181,061

(22) Filed: Jul. 28, 2008

(65) Prior Publication Data

US 2010/0018842 A1    Jan. 28, 2010

(51) Int. Cl.
*B65G 23/06* (2006.01)
(52) U.S. Cl. .................................. 198/834; 198/835
(58) Field of Classification Search ............... 198/835, 198/834, 847
See application file for complete search history.

(56) References Cited

U.S. PATENT DOCUMENTS

| | | | |
|---|---|---|---|
| 3,033,050 A | | 5/1962 | Hisserich |
| 3,050,178 A | * | 8/1962 | Stone .......................... 198/834 |
| 3,078,205 A | | 2/1963 | Sauer et al. |
| 3,338,107 A | | 8/1967 | Kiekhaefer |
| 3,859,865 A | | 1/1975 | Conrad |
| 5,020,656 A | | 6/1991 | Faulkner |
| 5,213,202 A | * | 5/1993 | Arnold ......................... 198/835 |
| 5,421,789 A | | 6/1995 | Gregg |
| 5,704,861 A | | 1/1998 | Feuerborn |
| 5,911,307 A | | 6/1999 | Krafft et al. |
| 6,068,354 A | * | 5/2000 | Akiyama et al. ............. 305/160 |
| 6,644,463 B2 | | 11/2003 | Mott |
| 6,672,983 B2 | * | 1/2004 | Mohr et al. .................. 474/152 |
| 6,938,754 B2 | | 9/2005 | Kanaris |
| 7,097,030 B2 | | 8/2006 | Gundlach |
| 7,114,788 B2 | | 10/2006 | Deland et al. |
| 7,210,573 B2 | | 5/2007 | Mol |
| 2007/0012549 A1 | * | 1/2007 | Kanaris ....................... 198/835 |
| 2009/0301845 A1 | | 12/2009 | DeGroot et al. |

FOREIGN PATENT DOCUMENTS

| JP | 10-296753 A | 11/1998 |
|---|---|---|
| JP | 11-013840 A | 1/1999 |

OTHER PUBLICATIONS

Cog-Veyor Systems, Inc, "Cog-Veyor Belting Manufacturers" catalog, date unknown, Woodbridge, Ontario, Canada.
International Search Report and Written Opinion of the International Searching Authority of International Patent Application No. PCT/US09/50858; Nov. 10, 2009; European Patent Office, Rijswijk, NL.

* cited by examiner

*Primary Examiner*—James R. Bidwell
(74) *Attorney, Agent, or Firm*—James T. Cronvich

(57) ABSTRACT

A flat belt conveyor that is flexible along its length and has a chevron drive and a matching drive drum with helical drive surfaces on its periphery to drive and track the belt. The flat belt may comprise a series of flexible modules, or belt segments, of one or more lengths joined end to end to form an endless belt of desired length.

17 Claims, 2 Drawing Sheets

POSITIVELY DRIVEN, TRACKING FLAT BELT AND CONVEYOR

BACKGROUND

The invention relates generally to power-driven conveyors and, more particularly, to endless flat conveyor belts that are positively driven.

Low-tension, positively driven flat conveyor belts are especially useful in conveying food products. One such conveyor belt is disclosed in U.S. Pat. No. 7,210,573. That belt has on its underside a plurality of equally spaced, parallel teeth extending across the width of the belt perpendicular to the direction of belt travel. Sprockets engage the teeth to drive the belt. But, unless the belt is restrained laterally in some way, it can wander to one side or the other and jam or damage its outside edge. Physical restraints or guides can help keep the belt on track, but do so by means of friction, which increases the amount of power and the size of the motor required to drive the belt.

Another problem with both tensioned flat belts and low-tension, positively driven flat belts is the difficulty in joining segments together to form an endless belt of the proper length. Conventional means of joining belt segments include fusing the opposing ends of consecutive segments together and using hinged clips, i.e., metal elements with a pivot pin and grippers that are forced into the opposing ends of consecutive segments, to connect consecutive segments. Both solutions are troublesome and difficult to perform in many applications.

Thus, there is a need to overcome the tracking and joining problems of positively driven flat belts.

SUMMARY

These shortcomings are overcome by a conveyor belt embodying features of the invention. One version of such a conveyor belt comprises a load-carrying side and an opposite driven side. Teeth extending outward from the driven side at regular intervals form regularly spaced drive-receiving surfaces that have portions oriented oblique to the direction of belt travel.

Another version of a conveyor belt comprises a load-carrying side and an opposite driven side. Regularly spaced drive-receiving surfaces formed on the driven side are arranged in a chevron pattern of regularly spaced stripes.

In another aspect of the invention, a conveyor comprises a conveyor belt that includes regularly spaced drive-receiving surfaces having portions oriented oblique to a direction of belt travel. A drum drive has helically arranged driving surfaces on its periphery that are matched to the drive-receiving surfaces of the conveyor belt to drive and track the belt by engaging the drive-receiving surfaces.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
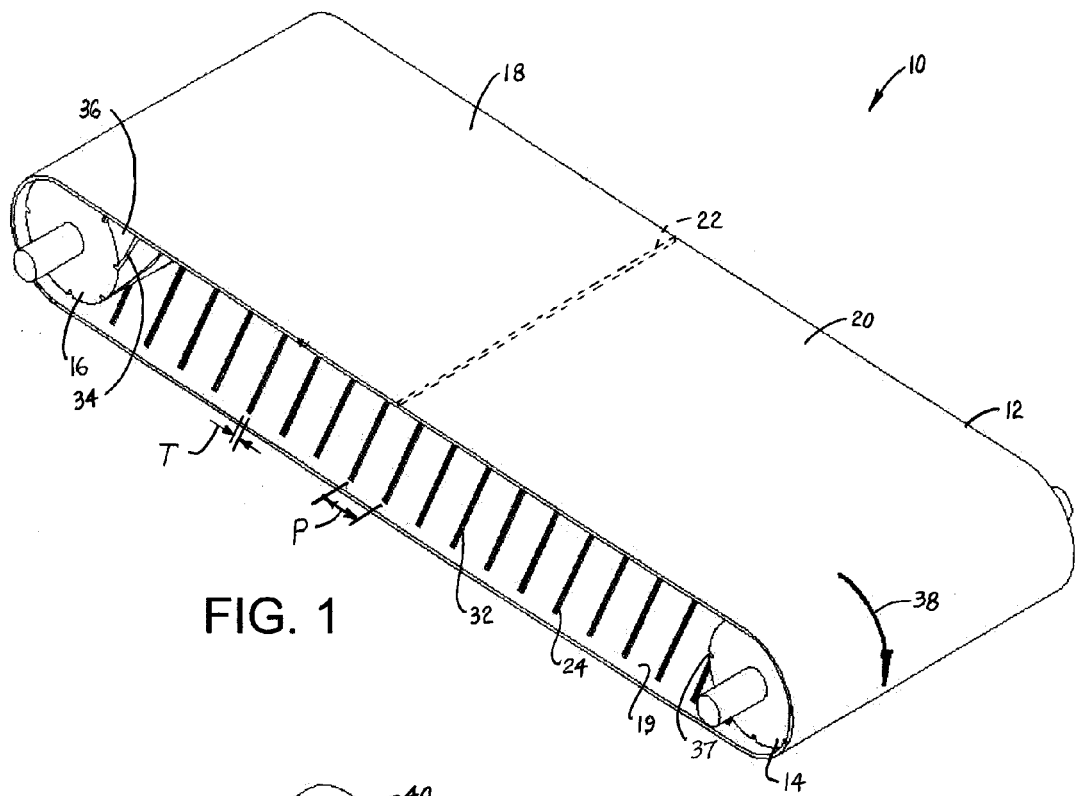
FIG. 1 is an isometric view of a conveyor embodying features of the invention including a chevron drive arrangement for a flat belt.

One version of a conveyor embodying features of the invention is shown in FIG. 1. The conveyor 10 comprises an endless conveyor belt 12 trained between a drive drum or pulley 14 and an idle drum or pulley 16. The belt is made of a resilient material, such as a thermoplastic polymer, an elastomer, or a rubber, and is flexible along its length. It may be reinforced by meshes, fibers, or other tension-bearing elements. The belt has an outer load-carrying side 18 and an opposite inner driven side 19. The load-carrying side preferably defines a continuous, i.e., seamless, load-carrying surface 20 along the entire length of the belt. The load-carrying surface shown is flat, but it could include contours providing flights or perforations providing passages for drainage or airflow through the belt. The belt may be made in one or more segments by molding or extrusion and welded together at one or more joined ends 22.

A series of teeth 24 extend outward of the driven side at regular intervals. The teeth are segmented into side-by-side pairs 26, 27 (better illustrated in FIG. 2) in which each pair forms a chevron stripe. A gap 28 extending the length of the belt along its centerline 30 separates each tooth from its mirror image on the opposite side of the centerline. The gap allows the belt to flex about the centerline and form a trough belt to carry aggregate materials, for instance. Preferably, the length of the regular interval, i.e., the pitch P of the belt, is much greater than the thickness T of the belt's teeth.

The chevron-patterned teeth define linear drive-receiving surfaces 32 on the trailing sides of the V-shaped drive-tooth pairs. As the belt wraps around the drive and idle drums, the teeth are received in helical grooves 34 formed in the peripheries 36 of the drums. The grooves are spaced apart around the periphery of the drum nominally by an arc length P, the pitch of the belt. The width of the grooves is preferably greater than the thickness of the belt teeth to allow for variations in the thickness of the teeth and between the pitch of the belt and the drum. Drive surfaces 37 bounding the grooves of the drive drum push against the drive-receiving surfaces on the belt's teeth to advance the belt in the direction of belt travel 38. Because the drive-receiving surfaces are oblique to the direction of belt travel, their engagement with the helical grooves in the drums provides inherent tracking and prevents the belt from wandering laterally.

Figure 2:
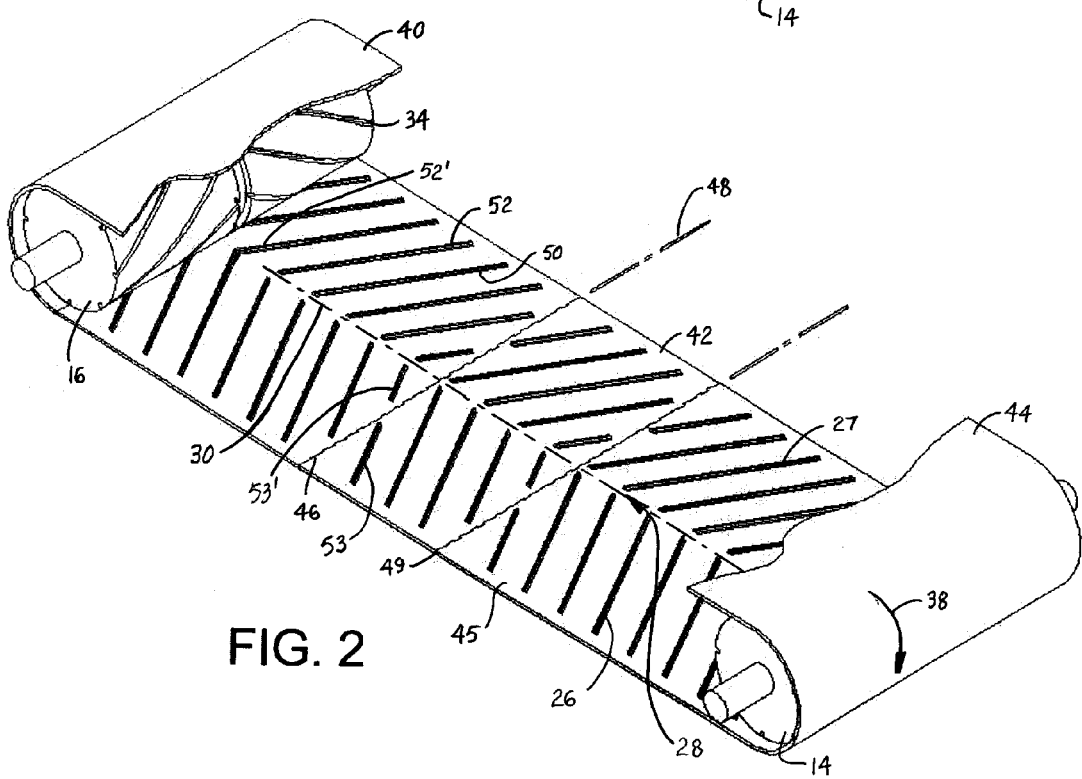
FIG. 2 is an isometric view, partly cut away, of a conveyor as in FIG. 1 including a belt made of resilient belt modules.
Figure 3A:
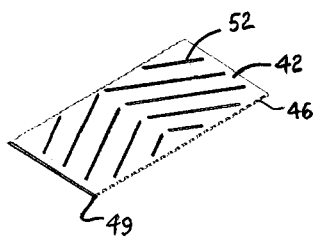
FIGS. 3A-3D are isometric views of typical belt modules used to construct the belt of FIG. 2.
Figure 3B:
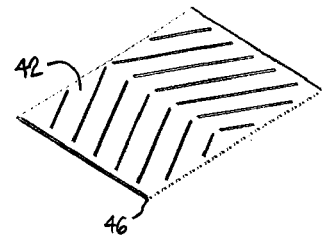
Figure 3C:
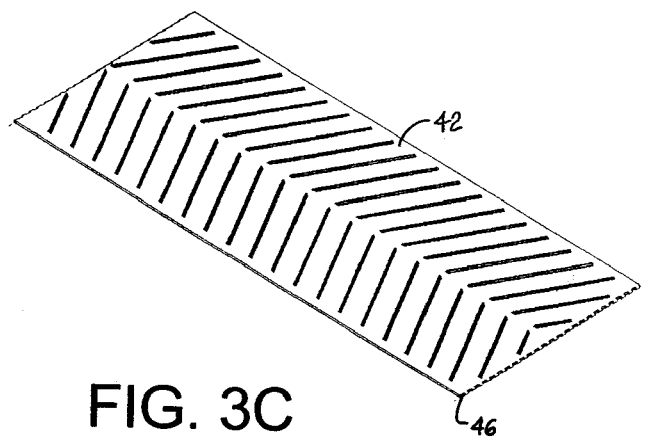
Figure 3D:
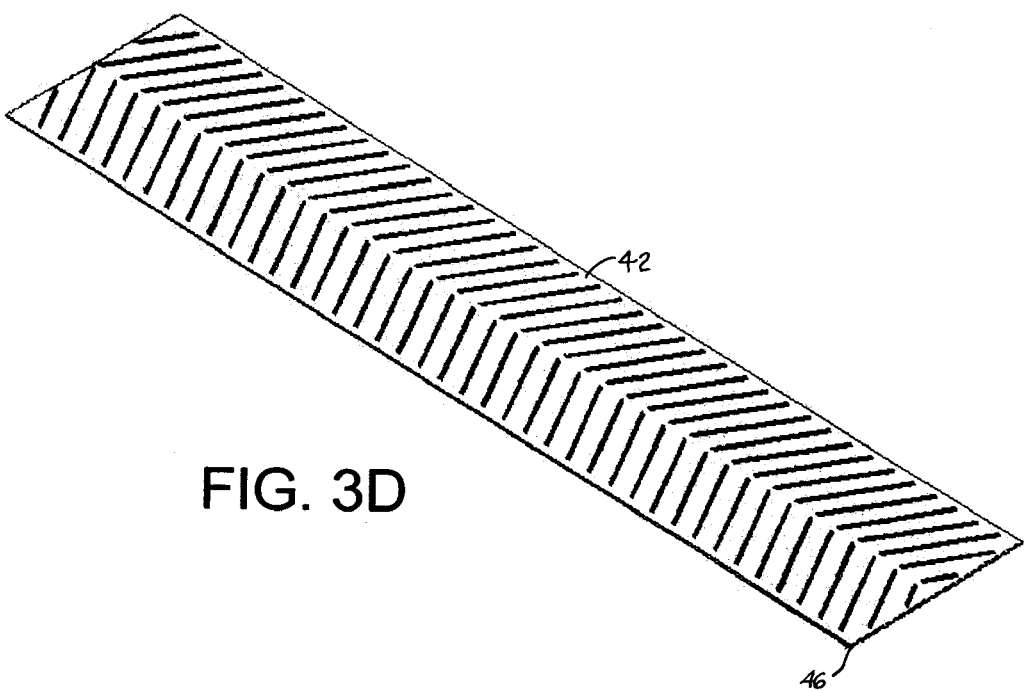

Another version of a belt is shown in FIG. 2. In this version, the belt 40 is constructed of a series of flexible belt modules 42. Each module, as also shown in FIG. 3, extends in thickness from a load-carrying surface 44 to a driven surface 45. Link ends 46 at each end of the module interleave with link ends of adjacent modules and are connected together by connecting pins 48 received in aligned apertures 49 in the link ends. The connecting pins may be headed or unheaded and removably retained in the interleaved link ends by retention structure on the pins themselves or in the outside edges of the belt modules. The kinds of retention structure used for the hinge rods in modular plastic conveyor belts are adaptable to the flexible belt segments of the invention. A damaged belt segment can easily be replaced by removing the connecting pins at the ends of the damaged segment, replacing the damaged segment with a new segment, and reinstalling the connecting pins to join the new segment into the belt. Drive-receiving surfaces 50 oblique to the direction of belt travel 38 are formed on the driven surfaces of the modules. In this example, the drive-receiving surfaces are formed on teeth 52 arranged in a pattern of regularly spaced chevron stripes. In this example, each chevron stripe is segmented across a gap where the vertex would be, but could alternatively be continuous without a gap along the centerline of the belt as indicated by unsegmented tooth 52'. Teeth closest to the ends of the modules form partial stripes 53, 53' broken at the link ends. Grooves 34 in drive and idle drums 14, 16 receive the V-shaped teeth.

As shown in FIGS. 3A-3D, the modules may be molded in different lengths, such as 1 ft, 2 ft, 3 ft, 5 ft, and 10 ft, and longer so that a belt of almost any length may be constructed of some combination of lengths of modules joined by connecting pins.

Although the invention has been described in detail with reference to a few preferred versions, other versions are possible. For example, the unsegmented teeth 52' shown as an alternative in the modular flat belt of FIG. 2 could be formed on the continuous flat belt of FIG. 1. The segmented teeth could be segmented by gaps along lanes other than at the centerline or by multiple gaps across the width of the belt for better troughing characteristics. As another example, the chevron pattern could be offset across the centerline with the half-stripe on one side staggered along the length of the belt relative to the half-stripe on the other side. Instead of forming V-shaped chevron stripes, the tooth pattern could define a series of segmented or unsegmented obliquely arranged diagonal lines extending across the width of the belt. And the patterns need not be linear as shown as long as they provide oblique drive-receiving surfaces to allow both driving and tracking. So, as these few examples suggest, the scope of the claims is not meant to be limited to the preferred versions described in detail.

What is claimed is:

1. A conveyor belt comprising:
    a load-carrying side;
    an opposite driven side;
    a plurality of teeth extending outward from the driven side at regular intervals to form regularly spaced drive-receiving surfaces having portions oriented oblique to the direction of belt travel;
    one or more flexible belt modules having link ends with apertures along opposite ends of the one or more belt modules and connected to form the conveyor belt by removable connecting pins received in the aligned apertures of the interleaved link ends of the one or more belt modules and wherein the load-carrying side and the driven side are opposite sides of the one or more belt modules.

2. A conveyor belt as in claim 1 wherein the drive-receiving surfaces are arranged in a chevron pattern of regularly spaced stripes.

3. A conveyor comprising a conveyor belt as in claim 2 arranged in a loop and a drive pulley having an outer periphery with helical grooves matched to the chevron pattern of the teeth to receive the teeth and drive and track the conveyor belt.

4. A conveyor belt as in claim 1 wherein each of the teeth is segmented with at least one gap in the drive-receiving surface.

5. A conveyor belt as in claim 4 wherein the gap is at the centerline of the conveyor belt.

6. A conveyor belt as in claim 1 wherein the drive-receiving surfaces are linear.

7. A conveyor belt as in claim 1 wherein the length of the regular interval in the direction of belt travel is greater than the thickness of the teeth.

8. A conveyor belt as in claim 1 wherein the conveyor belt is flexible throughout its length and has a continuous load-carrying surface on the load-carrying side.

9. A conveyor belt comprising:
    a load-carrying side;
    an opposite driven side;
    a plurality of regularly spaced drive-receiving surfaces formed on the driven side and arranged in a chevron pattern of regularly spaced stripes;
    one or more flexible belt modules having link ends with apertures along opposite ends of the one or more belt modules and connected to form the conveyor belt by removable connecting pins received in the aligned apertures of the interleaved link ends of the one or more belt modules and wherein the load-carrying side and the driven side are opposite sides of the one or more belt modules.

10. A conveyor belt as in claim 9 wherein the drive-receiving surfaces extend outward of the driven side of the conveyor belt.

11. A conveyor belt as in claim 9 wherein each half of each drive-receiving surface is a mirror image of the other half about the centerline of the conveyor belt.

12. A conveyor belt as in claim 9 wherein the conveyor belt is flexible throughout its length and has a continuous load-carrying surface on the load-carrying side.

13. A conveyor belt as in claim 9 wherein each of the regularly spacing driving surfaces is segmented across the width of the belt.

14. A conveyor comprising:
    a conveyor belt including a load-carrying side and an opposite driven side and a plurality of regularly spaced drive-receiving surfaces on the driven side having portions oriented oblique to a direction of belt travel and one or more flexible belt modules having link ends with apertures along opposite ends of the one or more belt modules and connected to form the conveyor belt by removable connecting pins received in the aligned apertures of the interleaved link ends of the one or more belt modules and wherein the load-carrying side and the driven side are opposite sides of the one or more belt modules; and
    a drum drive having helically arranged driving surfaces on its periphery matched to the drive-receiving surfaces on the driven side of the conveyor belt to drive and track the belt by engaging the drive-receiving surfaces.

15. A conveyor as in claim 14 wherein the conveyor belt has teeth protruding outward of the driven side of the belt to form the drive-receiving surfaces.

16. A conveyor as in claim 14 wherein the drive-receiving surfaces form a chevron pattern on the driven side of the belt.

17. A conveyor as in claim 14 wherein the drum drive has helical grooves on its periphery bounded on one side by the helically arranged driving surfaces.

* * * * *